(12) United States Patent
Yoshizaki et al.

(10) Patent No.: US 11,173,953 B2
(45) Date of Patent: Nov. 16, 2021

(54) SYSTEM AND METHOD FOR CALIBRATING A STEERING WHEEL NEUTRAL POSITION

(71) Applicant: Toyota Motor Engineering & Manufacturing North America, Inc., Plano, TX (US)

(72) Inventors: Coh L. Yoshizaki, Wixom, MI (US); Akio Kimura, Novi, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 221 days.

(21) Appl. No.: 16/524,997

(22) Filed: Jul. 29, 2019

(65) Prior Publication Data

US 2021/0031831 A1    Feb. 4, 2021

(51) Int. Cl.
*B62D 5/04* (2006.01)
*G01C 25/00* (2006.01)
*B62D 15/02* (2006.01)
*B62D 5/00* (2006.01)

(52) U.S. Cl.
CPC ........... *B62D 5/0493* (2013.01); *B62D 5/006* (2013.01); *B62D 15/0235* (2013.01); *G01C 25/005* (2013.01)

(58) Field of Classification Search
CPC .................................................. B62D 5/0493
See application file for complete search history.

(56) References Cited

U.S. PATENT DOCUMENTS

| 7,065,436 | B2 | 6/2006 | Hara |
| 7,400,236 | B2 | 7/2008 | Kade et al. |
| 9,090,263 | B2 * | 7/2015 | Zeng .................. G06K 9/00798 |
| 10,089,537 | B2 | 10/2018 | Nix et al. |
| 2021/0031831 | A1 * | 2/2021 | Yoshizaki .......... B62D 15/0245 |

FOREIGN PATENT DOCUMENTS

| CN | 102398598 B | 4/2012 |
| EP | 1170651 B1 | 1/2002 |
| JP | 2000214180 A | 8/2000 |
| JP | 2014046710 A | 3/2014 |

* cited by examiner

*Primary Examiner* — Michael A Berns
(74) *Attorney, Agent, or Firm* — Christopher G. Darrow; Darrow Mustafa PC

(57) ABSTRACT

System, methods, and other embodiments described herein relate to calibrating a steering wheel in a steering system of a vehicle. In one embodiment, the disclosed calibration system detects an object in front of the vehicle based on first data generated by one or more front sensors of the vehicle, detects the object to the rear of the vehicle based on second data generated by one or more rear sensors of the vehicle, determines a trajectory of the object based on the first data and output data from a steering wheel sensor, determines an estimate position of the object based on the trajectory, determines that the second data indicates a difference exists between the estimate position of the object and an actual position of the object, and determines a correction offset adjustment to apply to the output data from the steering wheel sensor based on the difference.

20 Claims, 4 Drawing Sheets

SYSTEM AND METHOD FOR CALIBRATING A STEERING WHEEL NEUTRAL POSITION

TECHNICAL FIELD

The subject matter described herein relates, in general, to a system and method for calibrating a vehicle steering wheel, and, more particularly, to leveraging data collected by front and rear sensors to aid in determining a steering wheel calibration adjustment.

BACKGROUND

Autonomous vehicles and driver-assist systems in vehicles include steering systems which can include one or more steering wheel position sensors and an electronic control unit (ECU) of that outputs a steering wheel angle based on data from the steering wheel position sensor. The steering system ECU can define the steering angle relative to a neutral position of the steering wheel.

Generally, the neutral position (i.e., zero degree turn angle) should correspond to the position of the steering wheel (and associated components) at which the vehicle is expected to travel along a straight path. Various systems in the vehicle may refer to the neutral position, e.g., to predict a straight path for the vehicle, to control the vehicle along a straight path, or to provide different types of operator assistance, such as parking assistance, power steering or stability assistance. However, over time the neutral position may fail to fully coincide with the straight-ahead travel of the vehicle, for example, due to ordinary wear and tear of gears or other incidental factors, such as an accident, introduction of new parts (e.g., new tires), or new configurations (e.g., rotation of the tires).

SUMMARY

The disclosed systems and methods relate to improving calibration and determination of a neutral position of a vehicle steering system.

In one embodiment, a calibration system of a vehicle includes one or more front sensors configured to acquire information about an environment at least in front of the vehicle, one or more rear sensors configured to acquire information about an environment at least to the rear of the vehicle, a steering wheel sensor that generates output data indicating an angular position of a steering wheel of the vehicle, one or more processors, and a memory communicably coupled to the one or more processors and storing: a detection module including instructions that when executed by the one or more processors cause the one or more processors to detect an object based at least on first data generated by the one or more front sensors and determine a plurality of datapoints from at least the first data, each datapoint indicating at least a position of an instance of the object relative to the vehicle and a time of capture, and a calibration module including instructions that when executed by the one or more processors cause the one or more processors to determine a trajectory of the object based at least in part on the plurality of datapoints, determine a predicted position of the object based on the trajectory, determine an actual position of the object based on second data generated by the one or more rear sensors, determine a difference between the predicted position and the actual position, and determine a correction offset to apply to the output data from the steering wheel sensor based on the difference.

In another embodiment, a method of calibrating a steering system of a vehicle, the steering system including a steering wheel sensor that outputs data indicating a position of a steering wheel of the vehicle, includes detecting an object in front of the vehicle based on first data generated by one or more front sensors of the vehicle, detecting the object to the rear of the vehicle based on second data generated by one or more rear sensors of the vehicle, determining a trajectory of the object based on the first data and the output data from a steering wheel sensor, determining an estimate position of the object based on the trajectory, determining that the second data indicates a difference exists between the estimate position of the object and an actual position of the object, and determining a correction offset adjustment to apply to the output data from the steering wheel sensor based on the difference.

In yet another embodiment, a non-transitory computer-readable medium for calibrating a steering system of a vehicle, the steering system including a steering wheel sensor that outputs data indicating a position of a steering wheel of the vehicle, includes instructions that, when executed by one or more processors, cause the one or more processors to: detect an object in front of the vehicle based on first data generated by one or more front sensors of the vehicle, detect the object to the rear of the vehicle based on second data generated by one or more rear sensors of the vehicle, determine a trajectory of the object based on the first data and the output data from a steering wheel sensor, determine an estimate position of the object based on the trajectory, determine that the second data indicates a difference exists between the estimate position of the object and an actual position of the object, and determine a correction offset adjustment to apply to the output data from the steering wheel sensor based on the difference.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
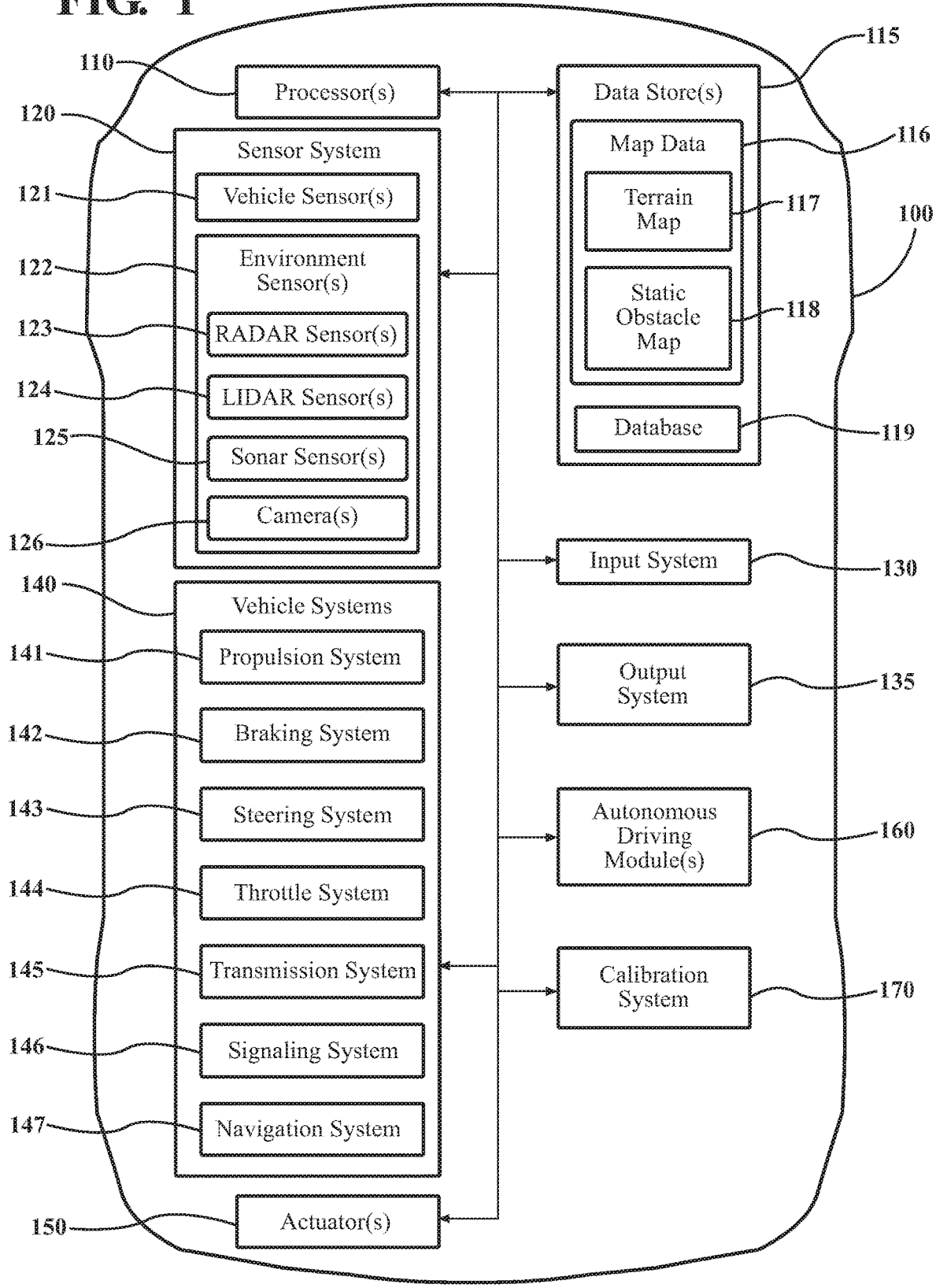
FIG. 1 illustrates one embodiment of a vehicle within which systems and methods disclosed herein may be implemented.

Systems, methods, and other embodiments associated with calibrating a steering wheel system for a vehicle are disclosed. As previously mentioned, a vehicle steering wheel positioned at a neutral position should cause the vehicle to travel in substantially a straight line. The true direction of the vehicle with the steering wheel in the neutral position can, however, be inaccurate due to various factors over time, such as ordinary wear and tear, strong impacts, etc.

Therefore, a calibration system and associated methods is disclosed that provides an improved technique for evaluating a current neutral position for accuracy and, if necessary, determining or adjusting an offset value for the neutral position. The disclosed approach can enhance various functions related to autonomous operation of the ego vehicle by consistently determining and maintaining a highly accurate steering model that accounts for shifts in the neutral position.

In one approach, the disclosed calibration system includes one or more front sensors disposed at a front region of the vehicle that obtain information about an environment at least in front of the vehicle, and one or more rear sensors disposed at a rear region of the vehicle that obtain information about an environment at least to the rear of the vehicle. The front and rear sensors can be implemented, for example, as cameras, radar, lidar, or other types of sensors that can capture information suitable for object detection.

In one or more embodiments the disclosed calibration system operates while the vehicle is in motion. Generally, the calibration system can analyze data from the one or more front sensors to identify and detect a target object in front of the vehicle. The target object can be any stationary object, such as a lane marker, a reflector, a sign, etc. The calibration system can track the position of the target object, for example, by capturing multiple instances of the object in progressing positions as the vehicle approaches and passes the target object. The calibration system can record the tracked positions in a coordinate form or other positional form as "datapoints".

A "datapoint," as used herein, can be defined as data that indicates at least a position of a target object. A datapoint can include information that indicates the position in any of various ways, such as information indicating a direct distance between the target object and the vehicle, a coordinate of the target object relative to the vehicle (e.g., in a relative coordinate system having a center of the vehicle 100 as point (0,0)), a geo-coordinate of the target object, such as a global position system (GPS) coordinate, or other type of positional information. A datapoint can also include additional information, such as a corresponding steering wheel angle, timestamp, or other contextual information.

The disclosed calibration system can analyze the data from the one or more rear sensors to identify the target object after the vehicle as passed the target object. Again, the calibration system can track the position of the target object, e.g., by capturing multiple instances of the object in receding positions as the vehicle moves away from the target object. The calibration system can record the receding positions as additional datapoints.

After a threshold number of datapoints have been recorded the calibration system can determine a trajectory function that models a trajectory of the target object relative to the vehicle. The trajectory function can receive inputs such as the datapoints, the vehicle steering wheel angle and the vehicle speed. Based on the trajectory function, the calibration system can determine a predicted position of the target object at a distance to the rear of the vehicle and determine whether the actual position indicated by the rear data aligns with the predicted position. If the actual position and the predicted position are not aligned, the calibration system can determine that the steering wheel neutral position is erroneous and determine a correction vector (e.g., an amount and direction) for an offset value of the steering wheel neutral position. Thus, by collecting and analyzing data from the front and the rear of the vehicle, the disclosed calibration system can improve detection of a steering wheel misalignment and continually improve a correction offset for a steering wheel neutral position.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments of the disclose subject matter are not limited to automobiles. In some implementations, the vehicle 100 may be a robotic device or form of powered transport that is, for example, equipped for communicating with vehicles or other devices and includes sensors to perceive aspects of the surrounding environment, and thus benefits from the functionality discussed herein to, for example, determine steering system accuracy and correction offsets.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-5 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a sensor system 120, a steering system 143 that controls a steering function of the vehicle, and a calibration system 170 that is implemented to perform methods and other functions as disclosed herein relating to detecting and correcting alignment errors in the steering system 143. The noted functions and methods will become more apparent in the following discussion of the figures.

Figure 2:
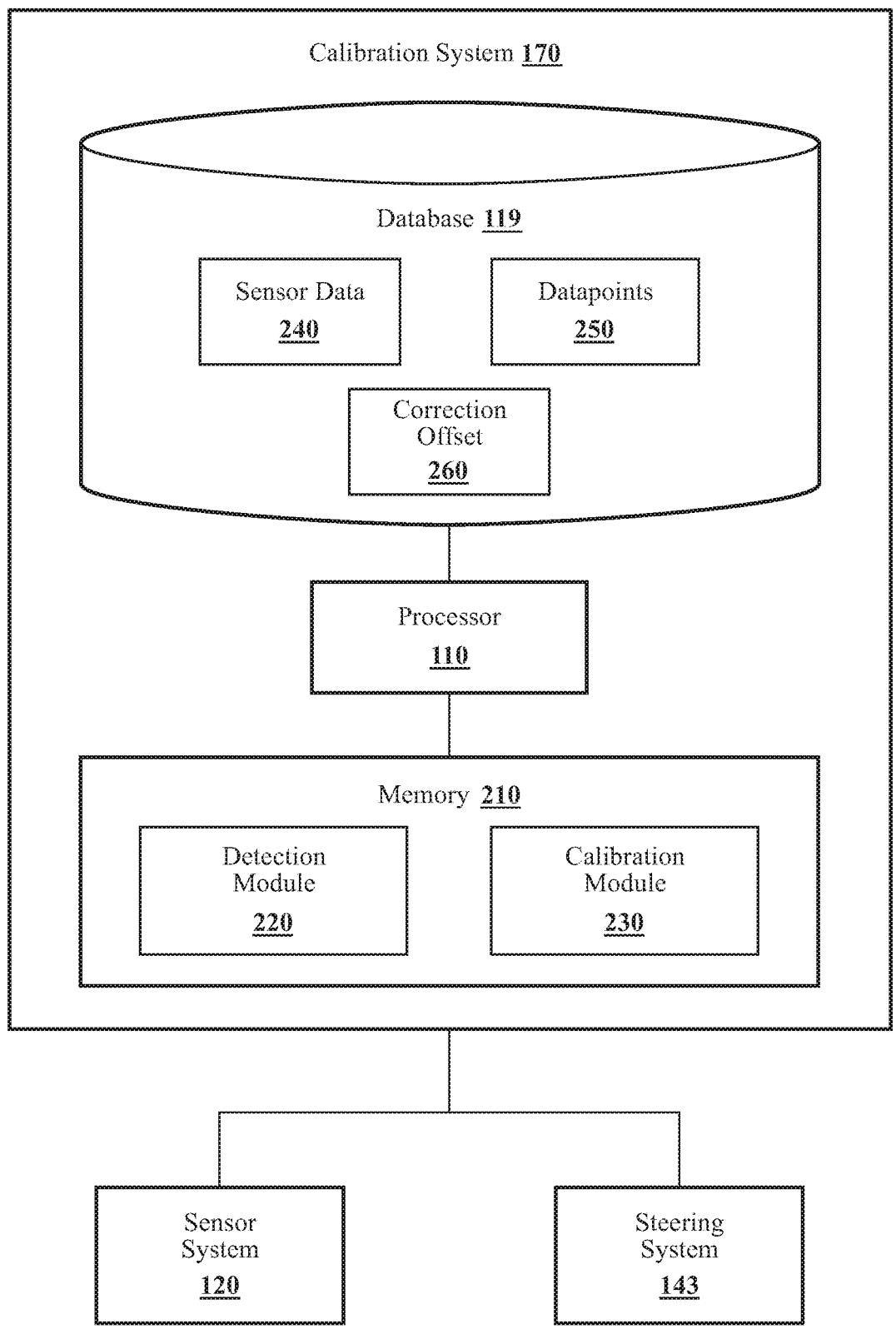
FIG. 2 illustrates one embodiment of a calibration system according to the disclosed embodiments.

With reference to FIG. 2, one embodiment of the calibration system 170 of FIG. 1 is illustrated. The calibration system 170 is shown as including a processor 110 and database 119 from the vehicle 100 of FIG. 1, as well as a memory 210.

In one or more embodiments, the processor 110 may be a part of the calibration system 170, the calibration system 170 may include a separate processor from the processor 110 of the vehicle 100, or the calibration system 170 may access the processor 110 through a data bus or another communication path.

The database 119 can store, among other information, sensor data 240, datapoints 250 and a correction offset 260, which will be described in turn further below. The database 119 is, in one or more embodiments, an electronic data structure that can be stored in the memory 210 or another data store, such as the vehicle 100 data store 115, a cloud-based storage, a removable memory device, or another suitable location that is accessible to modules 220 and 230 stored in the memory 210. The database 119 is configured with routines that can be executed by the processor 110 for analyzing stored data, providing stored data, organizing stored data, and so on. Thus, in one embodiment, the database 119 stores data as described above that is used by modules 220 and 230 in executing various functions, as well as other types of data.

The memory 210 can store, among other things, a detection module 220 and a calibration module 230. The memory 210 can be implemented as a random-access memory (RAM), read-only memory (ROM), a hard-disk drive, a flash memory, or other suitable memory for storing the modules 220 and 230. The modules 220 and 230 can be, for example, constructed as computer-readable instructions that when executed by the processor 110 cause the processor 110 to perform the various functions disclosed herein.

The detection module 220 is generally constructed including instructions that function to control the processor 110 to detect a target object in front of the vehicle 100 based on an analysis of first data generated by one or more "front sensors" of the sensor system 120 (e.g., sensors disposed to capture information about a region or environment in front of the vehicle 100), and subsequently detect the target object to the rear of the vehicle 100 based on an analysis of second data generated by one or more "rear sensors" of the sensor system 120 (e.g., sensors disposed to capture information about a region or environment to the rear of the vehicle 100). The detection module 220 can use any of various machine learning-based or deep learning-based approaches, such as support vector machines (SVM) or convolution neural networks (CNN) to execute the object detection.

In one or more embodiments, the first data and second data can include multiple image captures of instances of the object, e.g., as captured by the front and rear sensors of the sensor system 120 while the vehicle 100 approaches and subsequently passes by the target object. The detection module 220 can analyze the captured images to execute object detection, locate the target object, and extract a plurality of datapoints 250, which may be stored temporarily in the database 119. As stated above, each datapoint 250 can indicate at least a position (e.g., relative coordinates) of an instance of the target object.

The calibration module 230 generally includes instructions that function to control the processor 110 to determine a trajectory of the target object based at least in part on datapoints 250 extracted from the first data obtained by front sensors of the sensor system 120 and determine a predicted position of the object based on the trajectory. After determining the predicted position the calibration module 230 can determine an actual position of the object to the rear of the vehicle 100 based on an analysis of the second data obtained by rear sensors of the sensor system 120. When a difference exists between the predicted position and the actual position, the calibration module 230 can determine or adjust a neutral position correction offset based on the difference.

As will be discussed in further detail below, in one or more embodiments the calibration module 230 can determine the trajectory function based at least in part on one or more of a position of a steering wheel of the vehicle 100 based on a steering wheel sensor, a plurality of datapoints, and a speed of the vehicle 100.

As shown in FIG. 2, the calibration system 170 can include or be operably connected with the steering system 143, which can include a steering wheel sensor, and with the sensor system 120, which can include the one or more front sensors one or more rear sensors. In one or more embodiments, the front and rear sensors can be implemented to include, for example, one or more of a camera, a radar sensor, a sonar sensor, or a lidar sensor, or other type of sensor capable of capturing a type of image suitable for executing object detection.

The sensor system 120 can therefore generate sensor data 240 which is transferred to the database 119 for storage. As used herein, "sensor data" can include captured raw data indicative of objects in the vicinity of the vehicle 100, such as other vehicles, lanes of a road, pedestrians, signs, etc., as well as environmental data such as weather, temperature, etc. The sensor data 240 may also include other information, such as timestamp information, metadata indicating additional information such as the source of the data, and so on. Thus, as described above, the sensor data 240 can provide information that components of the calibration system 170 can use to track a target object and obtain relative measurements between the vehicle 100 and the target object.

Figure 3:
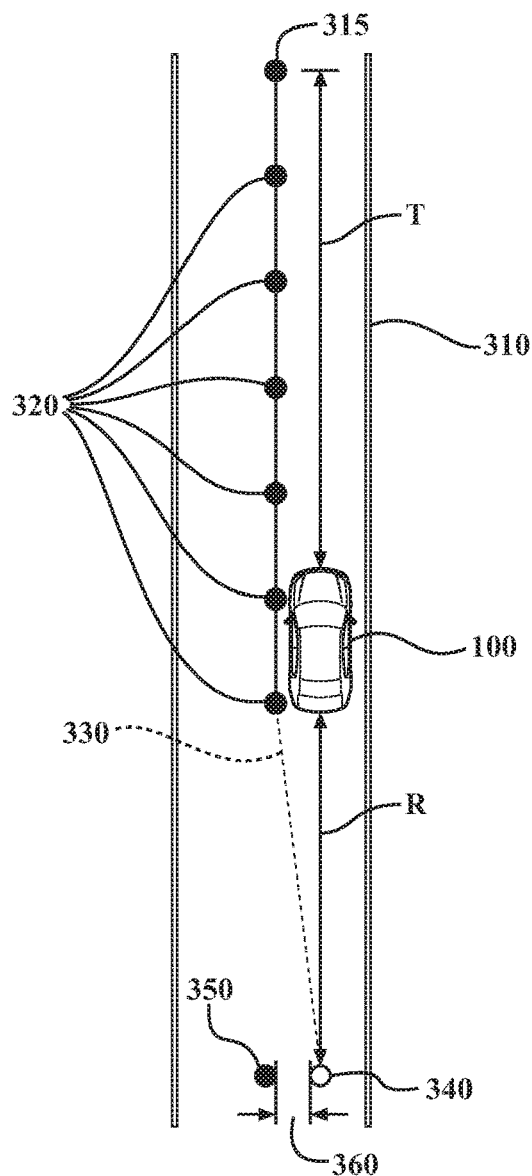
FIG. 3 illustrates an example scenario in which a calibration cycle according to the disclosed embodiments may be executed.

The detection module 220 and the calibration module 230 can cooperatively function in a cycle to analyze sensor data 240, generate datapoints 250 and determine a neutral position offset adjustment for the steering system 143. FIG. 3 illustrates a simplified example scene in which a steering system calibration cycle according to the disclosed subject matter takes place. The vehicle 100 is traveling along a substantially straight section of a road 310. While the disclosed calibration system 170 can execute a calibration cycle on a curved road, a straight line of travel can provide improved accuracy for calibrating a neutral position (i.e., straight) of the steering system 143. Accordingly, in one or more embodiments the detection module 220 can access map data 116 (FIG. 1) or other available map data, e.g., from a cloud server, to identify a preceding straight line of travel in which to initiate one or more calibration cycles.

At the start of the calibration cycle, the front sensors of the sensor system 120 captures an initial image. The detection module 220 can analyze the image, identify a target object, and determine a datapoint 315 that indicates a position of the target object.

Generally, the target object is a stationary object that the detection module 220 can determine is at least a threshold distance T ahead of the vehicle, where T is a value adequate to allow the calibration system 170 sufficient time to obtain a threshold number of datapoints 250 at the current speed at which the vehicle 100 is traveling. In one or more embodiments, the target object can be a predetermined object, such as a lane marker, that the detection module 220 has learned to identify, e.g., through training with multiple samples. Alternatively, in one or more embodiments the sensor system 120 can capture a plurality of images that the detection module 220 can analyze to identify and select a suitable target object. For example, the detection module 220 can rate how confidently it can identify an object, with a given object that is recognizable above a threshold confidence level being selected as the target object.

In any case, the detection module 220 identifies the target object in a captured image that indicates the target object is situated beyond the threshold distance T ahead of the vehicle, then determines a datapoint 315 for the target object. As the vehicle 100 approaches and passes the target object, the sensors of the sensor system 120 capture a plurality of images that include the target object. For example, in one or more embodiments the front sensors of the sensor system 120 can capture images at high frequency, e.g., 60 images per second, to obtain a sufficiently sized set of datapoints. The detection module 220 analyzes the plurality of images to determine the additional datapoints 320 for the target object.

After a threshold number of datapoints 320 have been determined, the calibration module 230 determines a trajectory function based at least in part on a plurality of the datapoints 320. For example, in one or more embodiments the calibration module 230 can determine a trajectory function after 120 datapoints have been generated by the detection module 220.

There are multiple ways that the calibration module 230 can determine or create the trajectory function. In one or more embodiments the calibration module 230 can determine the trajectory function based on the datapoints 320 and one or more additional input factors, such as the vehicle speed, the steering wheel sensor output, time of the data, etc. In one or more embodiments, the calibration module 230 can determine the trajectory function using an interpolation technique, such as linear interpolation or polynomial interpolation, to generate a function based on a line or curve of the datapoints 320 shifted according to the degree of the steering wheel angle (i.e., as indicated by the output of a steering wheel sensor of the steering system 143).

For example, referring to FIG. 3, the steering wheel sensor of the steering system 143 may output data that indicates the steering wheel is currently turned 3.2 degrees. Based on the datapoints 320, the steering wheel sensor output data, and the speed of the vehicle 100, the calibration module 230 can determine a trajectory curve 330 that indicates an estimated position 340 at which the target object should be disposed at a distance of R to the rear of the vehicle. The calibration module 230 can analyze data from the rear sensors to determine an actual position 350 of the target object.

A difference 360 between the actual position 350 and the estimated position 340 indicates that the steering angle determined by the steering wheel sensor is erroneous. That is, for example, while the steering wheel sensor indicates that the current angle of the steering wheel is 3.2 degrees, in fact, the steering system 143 is exhibiting an effective angle that is lower, such as 1.1 degrees. Thus, when the calibration module 230 determines that the actual position 350 differs from the estimated position 340 above a threshold amount, the calibration module 230 can determine a correction offset 260 (FIG. 2) for the steering wheel neutral position.

Figure 4:
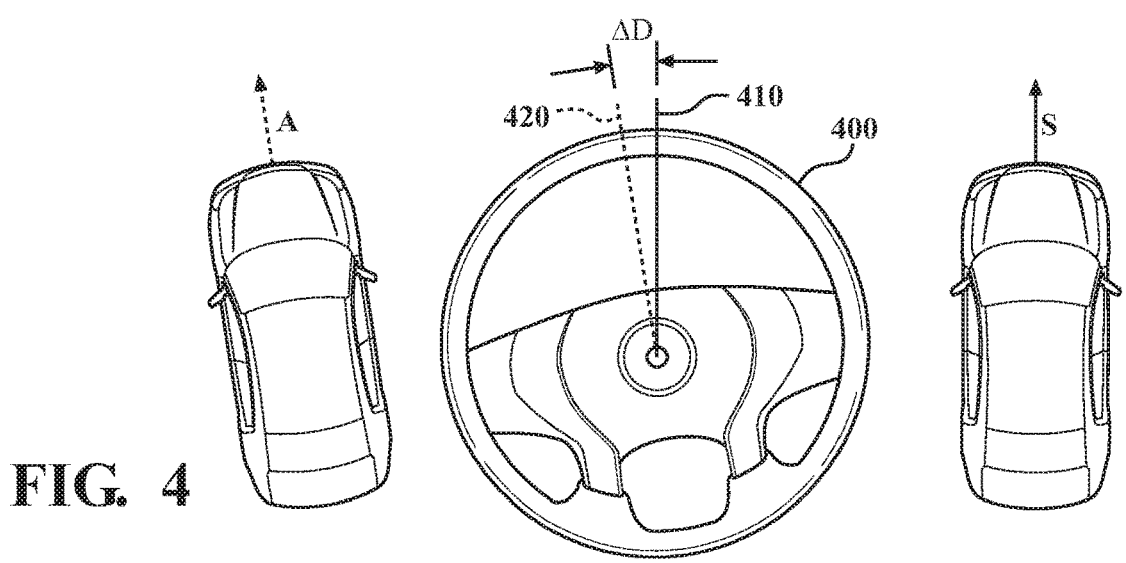
FIG. 4 illustrates an example steering wheel and aspects related to an example neutral position.

FIG. 4 shows an example steering wheel 400 of a steering system 143 in vehicle 100. At the actual neutral position 410, i.e., zero degrees, the vehicle 100 should proceed in a straight direction S. However, due to wear and tear, an accident, new parts or the like, the neutral position 410 may actually cause the vehicle 100 to travel slightly to the right or left, e.g., in an angled direction A as if the steering wheel 400 was positioned at a non-zero degree angle, i.e., the effective neutral position 420. A degree difference ΔD therefore exists between the actual neutral position 410 and the effective neutral position 420. It is this difference ΔD that causes the misalignment between the estimated position 340 and the actual position 350 of the target object in FIG. 3.

For relatively small degree shifts a human driver may automatically compensate based on "feeling" without perceiving that the actual neutral position 410 is slightly off. For example, for a ΔD as small as two or three degrees a human driver may simply hold the steering wheel 400 at an angle to compensate against ΔD when the driver desires to go straight. However, any system of the vehicle 100 that relies on the neutral position as being a position that causes the vehicle 100 to drive straight will be at risk of producing erroneous results which, in some cases, may lead to an accident.

Thus, the correction offset 260 indicates a degree of correction that should be applied to the steering angle to correct ΔD. Referring back to FIG. 3, when a difference 360 exists between the estimated position 340 and the actual position 350 of the target object, the calibration module 230 either creates a correction offset 260 to store in the database 119 or, if one has already been created, adjusts the correction offset 260. In one or more embodiments the calibration module 230 determines a correction offset 260 that will completely correct ΔD. In one or more embodiments the calibration module 230 determines an incremental value for the correction offset 260 that will incrementally correct ΔD, e.g., to avoid effecting a relatively large change all at once.

After the correction offset 260 has been stored or adjusted, the calibration system 170 is finished with a calibration cycle and can subsequently begin another to determine whether further adjustment to the correction offset 260 is required. In this manner the calibration system 170 can continually maintain an accurate correction offset 260 responsive to the current constitution of the vehicle 100.

Figure 5:
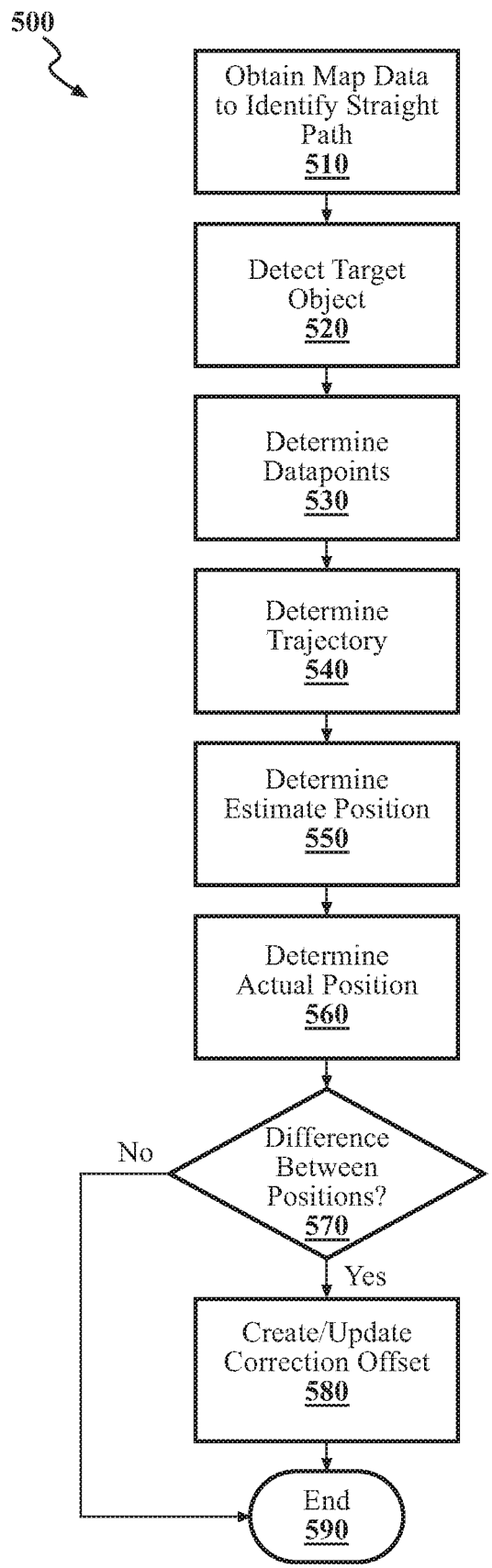
FIG. 5 illustrates a flowchart of a calibration cycle according to the disclosed embodiments.

FIG. 5 illustrates a flowchart of a method 500 of executing a calibration cycle according to the disclosed embodiments. Method 500 will be discussed from the perspective of the calibration system 170 of FIGS. 1 and 2. While method 500 is discussed in combination with the calibration system 170, it should be understood that the method 500 is not limited to implementation within the calibration system 170, which is merely one example of a system that may implement the method 500.

At operation 510, the detection module 220 can optionally obtain map data 116 to identify a straight path to detect a target object along. The calibration system 170 can execute a calibration cycle on a curved path, however, better results may be achieved on a straight path. The detection module 220 can communicate with the navigation system 147 to determine a location of the vehicle 100 and analyze the map data 116 to determine a current or upcoming straight path, for example, having a threshold length, upon which to proceed with the calibration cycle.

At operation 520 the detection module 220 proceeds to detect a target object. It should be noted that while the embodiments have been described as detecting the target object ahead of the vehicle 100 it is possible for the disclosed calibration system 170 to operate while the vehicle 100 is moving in reverse, in which case the target object would be detected to the rear of the vehicle 100. However, for simplicity of explanation the calibration cycle will continue to be discussed based on an implementation in which the vehicle 100 is traveling forward.

To detect the target object, the detection module 220 first identifies a suitable target object in one or more images captured by the sensor system 120. In one or more embodiments the target object can be any object that the detection module 220 can detect above a threshold confidence level and determine to be a stationary object that is a threshold distance ahead of the vehicle 100. For example, the target object can be a sign, lane marker, a building, etc.

At operation 530 the detection module 220 determines a plurality of datapoints, each datapoint indicating at least a position of the target object relative to the vehicle 100 as the vehicle 100 approaches the target object. The datapoints can further include additional data, such as the angle of the steering wheel as indicated by the steering wheel sensor, the speed of the vehicle 100, a timestamp, or other contextual information.

At operation 540 the calibration module 230 determines a trajectory of the target object. The calibration module 230 can determine the trajectory by determining a trajectory function based at least on a plurality of the datapoints and the steering wheel angle as indicated by the steering wheel sensor. If a correction offset 260 exists, the calibration module 230 applies the correction offset 260 to the steering wheel angle in determining the trajectory function. The trajectory function can vary in complexity according to a desired level of accuracy or in accordance with available processing power. For example, in one or more embodiments the calibration module 230 can use relatively simple interpolation techniques to derive a function based on the inputs of the datapoints and the corresponding steering wheel angle positions. In one or more embodiments more complex techniques can be used to derive a function based on the datapoints, the steering wheel angel, the vehicle speed, the timestamps, etc.

At operation 550 the calibration module 230 determines an estimate position for the target object based on the trajectory as defined by the trajectory function. The estimate position can be located a threshold distance to the rear of the vehicle 100.

At operation 560 the calibration module 230 analyzes the data from the sensor system 120 to determine an actual position at which the target object was detected, at the same distance from the vehicle 100 as the estimate position.

At operation 570 the calibration module 230 determines whether there is any difference between the estimate position and the actual position. If there is no difference (i.e., the estimate position and the actual position are aligned) or if the difference falls below a minimum threshold, then the calibration cycle is complete and ends at operation 590.

If a difference above the minimum threshold exists between the estimate position and the actual position, at operation 580 the calibration module 230 creates a correction offset 260 to be applied the steering wheel sensor output. The difference indicates that the current neutral position of the steering wheel does not coincide with controlling the vehicle 100 to drive straight ahead. The calibration module 230 can determine a correction direction and amount based on the lateral direction and amount of the difference. In one or more embodiments, the calibration module 230 can determine a complete correction offset 260, e.g., when the difference is below a threshold amount. In one or more embodiments, the calibration module 230 can determine an incremental correction offset 260, e.g., 0.25 degrees, when the difference is above a threshold amount to reduce an effect of a significant, sudden change to operational outcomes of systems that will apply the correction offset 260 to the neutral position.

After the process ends at operation 590, the calibration system 170 can subsequently begin another calibration cycle. That is, for example, the calibration system 170 can periodically begin calibration cycles while the vehicle 100 is in operation to continually check and tune the correction offset 260.

Accordingly, the disclosed calibration system 170 maintains the correction offset 260 in a condition of moving toward increased accuracy or maintaining a sufficiently accurate state. Other systems of the vehicle 100 apply the correction offset 260 to the neutral position to obtain a more accurate reference model of the steering system 143. For example, the vehicle 100 may include an automatic parking system that relies on the steering wheel sensor output and the neutral position to control the vehicle to move straight forward while parking. By applying the correction offset 260, the automatic parking system will be able to more accurately control the vehicle 100 in a parking maneuver. In another example, the vehicle 100 may include a rear view park assist system that displays guidelines predicting a path of the vehicle 100 as a user drives in reverse. The rear view park assist system can apply the correction offset 260 achieve more accurate guidelines that predict an actual direction the vehicle 100 will travel in. Thus, the disclosed calibration system 170 can improve multiple operations of the vehicle 100.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes that can apply the correction offset 260 and in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

As previously stated the vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include the map data 116 that is accessible to the detection module 220. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. In one or more embodiments, the detection module 220 can select a static obstacle as a target object. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras. As described above, the sensor system 120 sensors can be arranged to include both front-facing and rear-facing sensors.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the calibration system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to apply the correction offset 260 and control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be constructed as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110 , and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data. The autonomous driving module(s) 160 can be further configured to receive lane change detection notifications and/or path estimations as described above.

The autonomous driving module(s) 160 can be configured to determine travel path(s) and apply the correction offset 260 in determining current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A calibration system of a vehicle, comprising:
   one or more front sensors configured to acquire information about an environment at least in front of the vehicle;
   one or more rear sensors configured to acquire information about an environment at least to a rear of the vehicle;

a steering wheel sensor that generates output data indicating an angular position of a steering wheel of the vehicle;
one or more processors; and
a memory communicably coupled to the one or more processors and storing:
  a detection module including instructions that when executed by the one or more processors cause the one or more processors to detect an object that is stationary based at least on first data generated by the one or more front sensors and determine a plurality of datapoints from at least the first data, each datapoint indicating at least a position of an instance of the object relative to the vehicle and a time of capture; and
  a calibration module including instructions that when executed by the one or more processors cause the one or more processors to determine a trajectory of the object relative to the vehicle based at least in part on the plurality of datapoints, determine a predicted position of the object based on the trajectory, determine an actual position of the object based on second data generated by the one or more rear sensors, determine a difference between the predicted position and the actual position, and determine a correction offset to apply to the output data from the steering wheel sensor based on the difference.

2. The calibration system of claim 1, wherein the one or more front sensors and one or more rear sensors each include at least one of a camera, a radar sensor, a sonar sensor, or a lidar sensor.

3. The calibration system of claim 1, wherein the calibration module determines the trajectory by determining a trajectory function based at least in part on two or more of the plurality of datapoints and the output data from the steering wheel sensor.

4. The calibration system of claim 1, wherein the detection module includes instructions to obtain map data that provides information about a current location of the vehicle and identifies a substantially straight path of travel along which the detection module detects the object.

5. The calibration system of claim 1, wherein the detection module includes instructions to detect the object when the vehicle is moving at a speed within a threshold range.

6. The calibration system of claim 1, wherein the calibration module includes instructions to determine the correction offset as an incremental value change in a direction determined to counter the difference.

7. The calibration system of claim 1, wherein the calibration module includes instructions to determine the trajectory after a threshold number of datapoints have been determined.

8. A method of calibrating a steering system of a vehicle, the steering system including a steering wheel sensor that outputs data indicating a position of a steering wheel of the vehicle, the method comprising:
  detecting an object that is stationary in front of the vehicle based on first data generated by one or more front sensors of the vehicle;
  detecting the object to a rear of the vehicle based on second data generated by one or more rear sensors of the vehicle;
  determining a trajectory of the object based on the first data and an output data from a steering wheel sensor;
  determining an estimate position of the object relative to the vehicle based on the trajectory;
  determining that the second data indicates a difference exists between the estimate position of the object and an actual position of the object; and
  determining a correction offset adjustment to apply to the output data from the steering wheel sensor based on the difference.

9. The method of claim 8, wherein the one or more front sensors and one or more rear sensors each include at least one of a camera, a radar sensor, a sonar sensor, or a lidar sensor, and the detecting the object based on the first data and the detecting the object based on the second data include capturing a plurality of images of the object as the first data and the second data.

10. The method of claim 8, wherein the detecting the object based on the first data comprises determining a plurality of datapoints from the first data, each datapoint indicating at least a position of an instance of the object relative to the vehicle and a time of capture, and wherein the determining the trajectory of the object comprises determining a trajectory function based at least in part on two or more of the plurality of datapoints and the output data from the steering wheel sensor.

11. The method of claim 10, wherein the determining the trajectory of the object comprises determining the trajectory after a threshold number of datapoints have been determined.

12. The method of claim 8, further comprising:
  obtaining map data that provides information about a current location of the vehicle; and
  identifying a substantially straight path of travel along which to detect the object in front of the vehicle.

13. The method of claim 8, wherein the detecting the object based on the first data further comprises detecting the object when the vehicle is moving at a speed within a threshold range.

14. The method of claim 8, wherein the determining the correction offset comprises determining the correction offset as an incremental value change in a direction determined to counter the difference between the estimate position of the object and the actual position of the object.

15. A non-transitory computer-readable medium for calibrating a steering system of a vehicle, the steering system including a steering wheel sensor that outputs data indicating a position of a steering wheel of the vehicle, the non-transitory computer-readable medium including instructions that, when executed by one or more processors, cause the one or more processors to:
  detect an object that is stationary in front of the vehicle based on first data generated by one or more front sensors of the vehicle;
  detect the object to a rear of the vehicle based on second data generated by one or more rear sensors of the vehicle;
  determine a trajectory of the object relative to the vehicle based on the first data and an output data from a steering wheel sensor;
  determine an estimate position of the object based on the trajectory;
  determine that the second data indicates a difference exists between the estimate position of the object and an actual position of the object; and
  determine a correction offset adjustment to apply to the output data from the steering wheel sensor based on the difference.

16. The non-transitory computer-readable medium of claim 15, wherein the one or more front sensors and one or more rear sensors each include at least one of a camera, a radar sensor, a sonar sensor, or a lidar sensor, and detecting the object includes capturing a plurality of images of the object as the first data and the second data.

17. The non-transitory computer-readable medium of claim 15, wherein the instructions to detect the object based on the first data comprise instructions to determine a plurality of datapoints from the first data, each datapoint indicating at least a position of an instance of the object relative to the vehicle and a time of capture, and wherein the instructions to determine the trajectory of the object comprise instructions to determine a trajectory function based at least in part on two or more of the plurality of datapoints and the output data from the steering wheel sensor.

18. The non-transitory computer-readable medium of claim 17, wherein the instructions to determine the trajectory of the object comprise instructions to determine the trajectory after a threshold number of datapoints have been determined.

19. The non-transitory computer-readable medium of claim 15, further including instructions to:
- obtain map data that provides information about a current location of the vehicle; and
- identify a substantially straight path of travel along which to detect the object in front of the vehicle.

20. The non-transitory computer-readable medium of claim 15, wherein the instructions to determine the correction offset comprise instructions to determine the correction offset as an incremental value change in a direction determined to counter the difference between the estimate position of the object and the actual position of the object.

* * * * *